United States Patent [19]
Manz

[11] Patent Number: 5,791,443
[45] Date of Patent: Aug. 11, 1998

[54] BRAKE SHOE ASSEMBLY

[75] Inventor: Ronald T. Manz, Anniston, Ala.

[73] Assignee: Dana Corporation, Toledo, Ohio

[21] Appl. No.: 639,094

[22] Filed: Apr. 24, 1996

[51] Int. Cl.$^6$ .......................................... F16D 69/00
[52] U.S. Cl. ..................... 188/250 B; 192/107 M; 188/264 G
[58] Field of Search ............... 188/250 B, 250 G, 188/250 A, 250 C, 250 R, 251 A, 251 R, 251 M, 264 G, 218 A, 255, 258, 242, 217, 73.1, 78; 192/107 M

[56] References Cited

U.S. PATENT DOCUMENTS

| | | | |
|---|---|---|---|
| 1,921,836 | 8/1933 | Pogue | 188/258 |
| 3,684,062 | 8/1972 | Johnson | 188/251 R |
| 5,261,512 | 11/1993 | Young | 188/250 B |
| 5,281,481 | 1/1994 | Hayward | 428/416 |
| 5,480,008 | 1/1996 | Hummel et al. | 188/73.37 |
| 5,535,858 | 7/1996 | Hummel et al. | 188/250 G X |

FOREIGN PATENT DOCUMENTS 405044749  2/1993  Japan .................. 188/250 E

OTHER PUBLICATIONS

Minnesota Mining & Mfg. Co. Technical Data on Epoxy Adhesives 2216 B/A Gray and 2216 B/A Translucent.

*Primary Examiner*—Robert J. Oberleitner
*Assistant Examiner*—Pamela Lipka
*Attorney, Agent, or Firm*—Oldham & Oldham Co., L.P.A.

[57] ABSTRACT

A brake shoe assembly for a drum brake of a vehicle is improved by the addition of a moisture-impervious coating material applied to the brake shoe, and especially the brake shoe table upon which a friction liner will be removably secured. This coating material is effectively bonded to at least the portion of the outer surface of the brake shoe table which will be covered by the friction liner before the friction liner is removably secured. The moisture-impervious coating material is substantially non-adhesively bonded to said friction liner and is preferably a cross-linkable polymeric material, especially an epoxy-based adhesive.

14 Claims, 1 Drawing Sheet

BRAKE SHOE ASSEMBLY

The present invention relates to an improved brake shoe assembly for a vehicle. More particularly, the present invention relates to a brake shoe wherein the brake shoe table upon which a friction brake liner is removably secured has been sealed with a sealing compound which has been allowed to cure prior to application of the friction brake liner. Even more particularly, the present invention relates to such a brake shoe table which has been coated with a moisture-impervious coating of an epoxy material.

BACKGROUND OF THE ART

The brake assemblies of all vehicles, but particularly large industrial utility vehicles such as dump trucks, tractors and trailer rigs, and the like are subjected to extreme forces during braking operations. Accordingly, brake assemblies and the components therefor are specially designed to withstand the high heat and stresses encountered during braking. These solutions generally do not attack an additional problem for brake assemblies: rusting and corrosion of the brake shoe. Such corrosion usually is due to the collection of moisture on the brake shoe, including on the brake shoe table, and the presence of moisture can lead to premature failure of the brake shoe, necessitating its removal and replacement.

Brake shoes typically are unprotected from below the vehicle. Road spray, often containing salt, tends to be directed towards and collected on brake shoes, causing the brake shoes to rust. At one time, asbestos frictional brake liners were used, and these provided a relatively high degree of flexibility to the brake liners. The flexibility of the liners enabled the brake liners to bend and tightly conform to the curvature of the brake shoe table to help provide a tight sealing contact between the brake liners and the brake shoe table. The tight fit between the brake liner and the brake shoe table prevented the presence of gaps being formed between the brake liner and the brake shoe table and therefore prevented moisture being collected between the brake liner and the brake shoe table. It is also possible that the very nature of the asbestos would help to wick up any moisture able to penetrate the gap and to transport it away from the brake shoe table through capillary action. However, asbestos is no longer used for such applications, and problem of brake shoe table corrosion has recurred.

The frictional brake liners that are now being used typically are formed from high-strength, substantially rigid materials which do not have the flexibility of the old asbestos brake liners. As a result of being stiff, the newer conventional brake liners do not always accurately mate with the brake shoe tables. Accordingly, gaps or cracks are often formed between the brake liners and the brake shoe tables, establishing a moisture pathway to the brake shoe table, where the moisture not only enters, but is quite often retained by the labyrinthine nature of the gap.

One method of correcting these gaps and providing a tighter sealing fit between the friction brake liners and the brake shoe table is to typically rework or "coin" the brake shoe tables after manufacture to achieve a radius that better fits the radius of the brake liner. Such a process increases the cost of the brake shoes and does not completely eliminate the gaps or cracks between the brake liners and the brake shoe tables. As a result, moisture is still able to reach the brake shoe table of some brake shoes, and, as mentioned above, the labyrinthine nature of these gaps exacerbates the problem.

The methods of attaching the frictional brake liners to the brake shoes have contributed to the contact of moisture with the brake shoe tables. In the past, rivets or bolts have been used to attach the brake liners to the brake shoe table. Such fasteners require holes to be drilled through the brake liner and through the brake shoe table. These fastener holes provide an additional passageway to the brake shoe table.

Recently, heat-cured epoxies have been utilized to bond the frictional brake liner to the brake shoe table. Applied as a molten adhesive, these epoxies fill any gaps between the brake shoe table and the brake liner. When cooled and set, the epoxies form a rigid, non-fluid attachment between the brake liner and the brake shoe table. However, the very hardness of the material facilitates cracking and breaking over time under high heat and stress. Once again, the cracks are small and crooked, providing easier access than escape, thus trapping the moisture on the brake shoe table. More importantly, the epoxy bond formed between the frictional brake liner and the brake shoe table is difficult to cleanly remove when the time comes to replace the sacrificial frictional brake liners.

Another proposed remedy has been to place a thin liner film of a pressure-sensitive adhesive, between the frictional brake liner and the brake shoe table. Such an adhesive remains flexible and somewhat fluid even when adhered, effectively eliminating the gaps. However, the clean removal of the adhesive liner film, which tends to gum up machinery used for removing and applying frictional brake liners, poses further unsolved problems.

Additionally, the problems encountered with the prior art methods of protecting the brake shoe table from corrosion are even exacerbated in the particular situation of trailers that are used in handling overseas containerized shipments. These trailers are not driven for large numbers of miles in a consistent fashion, so they will sit for days at a time, exposed to salt air, without the brakes being heated up through use. Because the trailers are not driven for large numbers of miles, the brake pads do not require removal and replacement as frequently temporally as the brake pads on trailers which are driven everyday. However, the potential for corrosion of the brake shoe is greatly increased. The present invention, by providing a method of sealing the brake shoe surfaces, up to sealing the entire brake shoe, provides a method of prolonging the useful life of the brake shoe in this particular use scenario.

Accordingly, it is desirable to provide a brake shoe assembly with a brake shoe table having a moisture-resistant coating which is not bonded to the frictional brake liner but which is bonded to the brake shoe table, to prevent corrosion of the brake shoe table.

SUMMARY OF THE INVENTION

An object of the present invention is therefore to provide an improved brake shoe assembly having a brake shoe with an arcuate web and an arcuate brake shoe table mounted on an inner surface of the brake shoe table to the web and a friction liner overlaid onto and secured to a portion of an outer surface of the brake shoe table for frictionally engaging a confronting surface of a brake drum during braking. The improvement to the brake shoe assembly is a moisture-impervious coating material applied to the brake shoe table. The coating material is effectively bonded to at least the portion of outer surface of the brake shoe table covered by the friction liner before the friction liner is secured to the brake shoe table and is cured such that the moisture-impervious coating material is substantially unbounded to the friction liner. The preferred moisture-impervious coating material is a cross-linked polymeric material, especially an epoxy-based adhesive.

In some applications of the present invention, the moisture-impervious coating material is effectively bonded to the entire outer surface of the brake shoe table, including the peripheral side edges and the inner surface of the brake shoe table.

In some other applications, the arcuate web comprises at least one strut having a pair of flat side surfaces. In some cases, the moisture-impervious coating material is further effectively bonded to these flat side surfaces.

The preferred manner of applying the moisture-impervious coating material is in a solvent-based liquid form which has a viscosity permitting it to be spread upon the surface to be covered in a uniform continuous layer. In other applications, however, powder coating methods may be used to adhere particles of the moisture-impervious coating material to the surfaces desired to be covered in a solvent-free particulate form, after which the item may be heated to allow the coating material to melt and flow to form a uniform continuous layer. Further heating will allow the material to cure or crosslink to finalize the bond between the material and the surface.

In addition to providing an improved brake shoe assembly, the present invention also applies to a providing an improved brake shoe with the brake shoe table being adapted for receiving a friction liner after the brake shoe has been coated with a layer of such a moisture-impervious coating material, there being substantially no bonding between the friction liner and the moisture-impervious coating layer.

BRIEF DESCRIPTION OF THE DRAWINGS

A better understanding of the present invention will be had when reference is made to the accompanying drawings wherein.

DETAILED DESCRIPTION OF THE DRAWINGS

Figure 1:
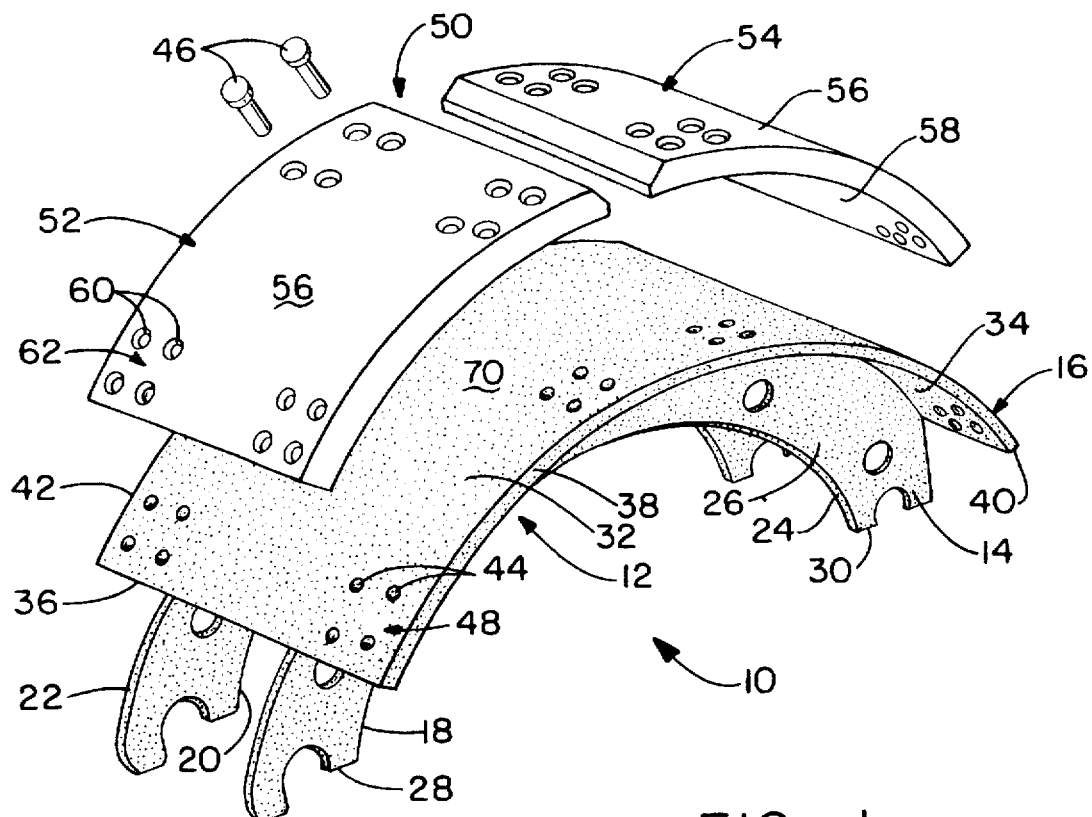
FIG. 1 is an exploded view in perspective of the brake shoe assembly of the present invention.

Referring now in greater detail to the drawings in which like numerals indicate like parts throughout the views, FIG. 1 illustrates in exploded perspective the brake shoe assembly 10 for vehicles such as automobiles and trucks. As illustrated in FIG. 1, the brake shoe assembly 10 of the present invention includes an arcuate shaped brake shoe 12, which includes a semicircular web 14 and a curved brake shoe table 16 mounted over the web in an overlapping relationship. As FIG. 1 illustrates, web 14 typically includes a pair of arcuately shaped struts or runners, 18 and 20, although a single strut may be used to form the web, and this is done in some applications without affecting the present invention. Each strut 18, 20 is formed from a high strength metal such as a high tensile strength steel. Each strut 18, 20 has a curved outer convex edge 22, a curved inner concave edge 24, substantially flat side surfaces 26, and first and second ends 28 and 30. Each strut 18, 20 is curved about a predefined radius as required to fit the desired braking assembly. The first and second ends of each strut 18, 20 are adapted for engaging the anchor pin and roller of a braking assembly and for rotatably securing the brake shoe 12 to the anchor pins.

As illustrated in FIG. 1, the brake shoe table 16 is mounted to the outer convex edges 22 of the struts 18, 20 of the web 14 of brake shoe 12. Typically, this mounting is achieved through welding. The brake shoe table 16 is a generally rectangularly shaped plate, typically formed from the same high tensile strength steel or similar high strength metal as the struts 18, 20. The brake shoe table 16 is curved about a radius that corresponds closely to the radius of the outer convex edge 22 of the struts 18, 20, which in turn corresponds very closely to the radius of the inside surface of the brake drum (not shown). The brake shoe table 16 includes an outer convex surface 32 that faces away from the web 14, an inner concave surface 34 that extends parallel and is attached to the convex outer edge 22 of the respective struts 18, 20. The brake shoe table 16 also has four side edges 36, 38, 40, 42 around its rectangular periphery. In the particular embodiment of a brake shoe assembly shown in FIG. 1, the brake shoe table 16 is positioned over the convex outer edges 22 of struts 18, 20, with the struts in spaced apart parallel relationship with each other and with side edges 38, 42 of the brake shoe table substantially overlapping the convex edges of the struts in a substantially T-shaped configuration. The other side edges 36, 40 of the brake shoe table 16 do not extend out as far as the respective first and second ends 28, 30 of the struts 18, 20.

The brake shoe table 16 is provided with a plurality of fastener openings 44 which extend through the brake shoe table adjacent the side edges 36, 38, 40, 42 of the brake shoe table for the insertion of fasteners 46 therethrough. The fastener openings 44 are generally cylindrically shaped bores shown in FIG. 1 as being arranged in groups 48 of four such fastener openings. It will, however, be understood that while groups of four fastener openings are illustrated herein, groups of greater or lesser numbers of fastener openings, i.e. two fastener openings, can be formed therethrough as desired without affecting the operativeness of the present invention.

As known in the prior art, the brake shoe assembly 10 of the present invention is completed by the installation of a friction brake liner 50 atop the brake shoe table 16 of the brake shoe 12. The friction brake liner 50 shown in FIG. 1 comprises a pair of brake pads 52, 54, although the use of one larger brake pad or several smaller brake pads could also accomplish the same goal. Each brake pad 52, 54 is a substantially rectangularly shaped block formed from a frictional material such as steel wool or a similar metal alloy material. Each brake pad 52, 54 includes a convex outer surface 56 for engaging a confronting surface of a rotary brake drum (not shown), and a concave inner surface 58 which faces and mates with the convex surface 32 of the brake shoe table 16. As illustrated in the accompanying figures, the brake pads 52, 54 collectively are of a length and width slightly less than the length and width of the brake shoe table 16, so that they do not overhang the edges 36, 38, 40, 42 thereof.

Figure 2:
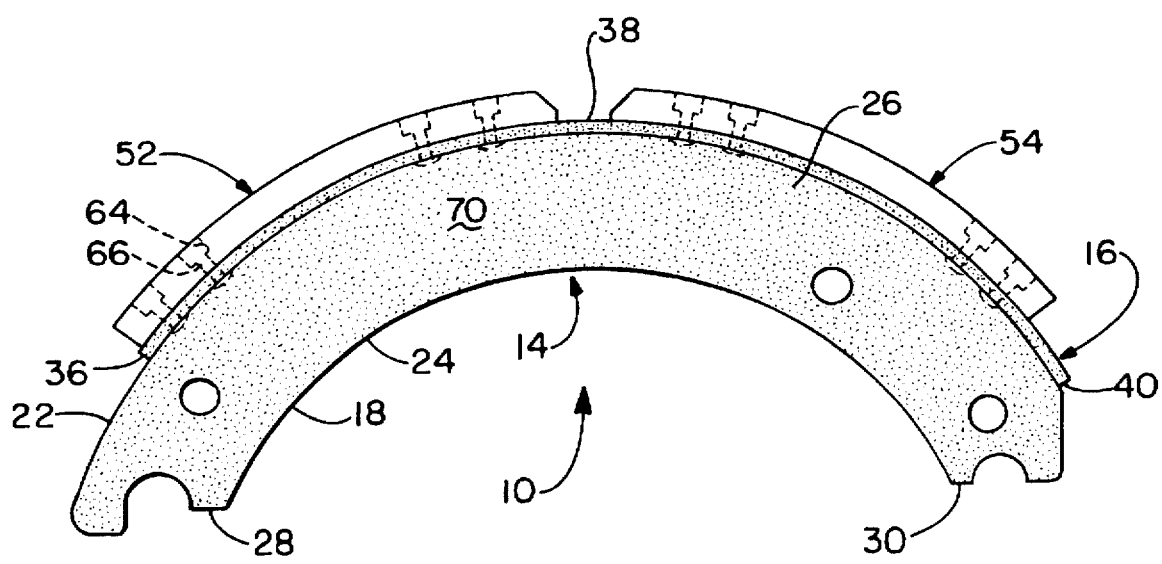
FIG. 2 is a side elevational view of an assembled brake shoe of the present invention.

A series of fastener openings 60 are formed through each of the brake pads 52, 54 comprising the friction brake liner 50. The fastener openings 60 are generally cylindrically shaped bores sized and arranged in groups 62 to correspond with the groups 48 of fastener openings 44 formed through the brake shoe table 16, and are aligned therewith when the brake pad is laid upon the brake shoe table. As best shown in FIG. 2, each of the fastener openings 60 includes a cylindrical recess 64 formed adjacent the upper surface 56 of the brake pad and a cylindrical lower bore 66 of a substantially smaller diameter than the recess extending from the recess through the lower surface 58 of each brake pad.

The brake pads 52, 54 are secured to the brake shoe table 16 through a series of fasteners 46 which are inserted through each of the aligned fastener openings 60 and 44 of the brake pads and the brake shoe table, respectively. The fasteners 46 are typically rivets or bolts, although other conventional fastening means also can be used. Each fastener 46 includes a head portion and a shank portion depending from the head. When inserted into the aligned fastener openings 60, 44 with the shank of the fastener 46 extending through the cylindrical recesses 64 and lower bores 66 of the fastener openings of the brake pads and through the fastener openings of the brake shoe table, the head of each fastener rests on the shoulder formed at the bottom of the cylindrical recess 64. The shanks of the fasteners are secured at their opposite ends against the inner brake shoe table surface 34 as by flattening the ends of the shank portions, if rivets are used, or by the use of a locking means such as a nut where bolts are employed. This method of seating the head of the fastener 46 within the cylindrical recesses 64 formed in the brake pads 52, 54 insures that the fasteners are not engaged by the confronting frictional surface of the brake drum when the outer surface 56 of the brake pad engages the brake drum during braking. It will be understood that in this particular application, the brake pads 52, 54 are intended as sacrificial elements, so that upon sufficient wearing of the outer surface 56, the brake pads will be removed from the brake shoe table and replaced with new brake pads of the same generally configuration. This removal and replacement will typically not be done by the manufacturer, so the removal and replacement of the brake pads should be a process that will not damage the brake shoe, thereby requiring its replacement.

In the improvement of the present invention, at least the portion of the outer surface 32 of the brake shoe table 16 of the brake shoe 12 upon which the friction brake liner 50 will be secured is sealed with a coating 70 (which is shown as stippling on the brake shoe 12 in FIGS. 1 and 2) of a moisture-impervious material prior to the brake pads being secured to the brake shoe table. In some applications of the present invention, it may be desirable to seal the entire brake shoe table 16 of the brake shoe 12 with a coating 70 of the moisture-impervious material. In a yet further application of the present invention, the entire outer surface of the brake shoe 12, including the web 14 and the brake shoe table 16, may be sealed against corrosion by application of a coating of the moisture impervious material. In any of these cases, however, the coating 70 is effectively bonded only to the surface of the brake shoe 12, and is not bonded to the inner surface 58 of the brake pads 52, 54. The coating 70 of the present invention serves only to seal the brake shoe surfaces from moisture and not to hold the friction brake liner 50, as exemplified by brake pads 52, 54, into position on the brake shoe table 16, so the coating is not subjected to nearly the level of stress, particularly shear stress, which is encountered in the situations where an adhesive bonding material interposed between the brake liner and the brake shoe table is relied upon as the sole means of retaining the brake liner in its place. In such instances, the priority of the designer is to assure adhesion rather than to protect the brake shoe surface, since the result of loss of a brake pad during braking is more dire than corrosion of the brake shoe table. As a consequence, a thicker layer of the bonding material would tend to be used, and the brittle nature of such material would increase the potential for the crack-type failures which expose the brake shoe table to corrosion.

Selection of the exact moisture-impervious coating, its thickness and the method of application provide opportunities for the designer to optimize for the particular situation. A number of flexible, two part, room-temperature curing epoxies are commercially available. One such product is the epoxy adhesive sold commercially by Minnesota Mining and Manufacturing Company under the trademark SCOTCH-WELD. Such a product has a modified-epoxy base and a modified amino accelerator, which have a work life in the range of about 90 to about 120 minutes after mixing in the proper proportions. Even though this particular product is useful as an adhesive, the intended use in the present invention does not require the bonding of the brake shoe table to the friction brake liner, so the preferred method of use is to apply this material in its solvent-based liquid form to the appropriate parts of the brake shoe in a proper thickness, allow the coating to set up initially, and to obtain a full cure prior to any contact with the friction brake liner. With the particular SCOTCH-WELD material, the full cure will occur at 150° F. in about 120 to about 240 minutes and will occur in 30 to 60 minutes at 200° F. Technical literature from the manufacturer of this material indicates that an effective thickness for this material, when used as an adhesive, is in the range of about 3 to about 5 mils (0.003 to 0.005 inches). For the particular application of the present invention, coating thickness is preferred to be no greater than this, and an effective moisture barrier is provided in a thinner layer if the coating material is carefully applied to assure that the coating is continuous.

A further method of applying an epoxy adhesive to a brake shoe table of this type is taught in U.S. Pat. No. 5,281,481, issued to Hayward and assigned to Borg-Warner Automotive Transmission & Engine Components Corporation of Sterling Heights, Mich. In that technique, the use of solvents is avoided by applying the coating in a finely-divided powder form to the brake shoe table and heating the brake shoe table to allow the powder to melt and flow, but not cross-link, until the friction material is applied over the brake shoe table and further heat and/or pressure is applied. While the present invention would not allow the friction brake liner to be applied to the brake shoe table until after a full cure of the adhesive, the application of the same adhesive to the brake shoe in a powdered form and complete curing of the adhesive on the brake shoe prior to any contact with the friction brake liner would result in the brake shoe assembly as taught in the present invention. In such a case, the friction brake liner would be secured to the brake shoe table only through the conventional use of fasteners as taught above, and not through the use of any adhesive properties available in the coating material prior to curing.

In some instances, the brake shoe is manufactured by one manufacturer and sold to another company that mounts the brake liner to the brake shoe. It will thus often be the customer or installer who will apply friction brake liners. The present invention operates very nicely in that circumstance, since the cured coating on the brake shoe table would not require any particular attention or care prior to application of the friction brake liner. Accordingly, the brake shoes can be shipped to the customers without the need of release liner sheets or the like to protect an adhesive coating and the coating process need not be practiced by the party affixing the friction brake liner to the brake shoe table. In similar fashion, the party who removes the used brake liners and replaces them does not need to remove any adhesive materials, and does not need to apply any adhesive materials. However, it would be prudent practice to examine the coating and repair it as necessary with additional coating, preferably in the solvent-based system described above, whenever the brake liners are replaced. Because the present invention does not rely upon the use of the adhesive properties of the coating material to hold a friction brake liner to the brake shoe but instead relies upon the coating material's ability to bond strongly to the brake shoe, the application of the particular coating material to surfaces beyond those upon which the friction brake liner is to be mounted is facilitated. Examples of such surfaces are the lower surface 34 of the brake shoe table 16, and the flat side surfaces 19 of the struts 18, 20, as well as the brake shoe table side edges 34, 36, 38 and 40. In the prior art methods of protecting only the portions of the brake shoe table upon which the friction brake liner is positioned, these surfaces are not protected. Corrosion which starts on these surfaces through exposure to moisture or the like may spread under the friction liner, obviating the need for the protective coating taught in some of the prior art. These surfaces are especially vulnerable to corrosion when the exposure is due to salt air and the like when the brake shoe is on a vehicle which sits for prolonged periods of time near a dock, etc.

While the foregoing invention has been described in the form of a preferred embodiment, it will be understood by those skilled in the art that numerous modifications, variations, and changes may be made thereto without departure from the spirit and scope of the invention as set forth in the following claims.

What is claimed is:

1. An improved brake shoe assembly for a drum brake having a brake shoe with an arcuate web and an arcuate brake shoe table mounted on an inner surface thereof to said web and a friction liner overlaid onto and secured to a portion of an outer surface of said brake shoe table for frictionally engaging a confronting surface of a brake drum during braking, wherein the improvement comprises:

a moisture-impervious coating material applied to said brake shoe table, said coating material effectively bonded to at least the portion of the outer surface of the brake shoe table covered by said friction liner prior to said friction liner being secured to the brake shoe table; said moisture-impervious coating material being substantially non-adhesively bonded to said friction liner.

2. The improved brake shoe assembly of claim 1 wherein said moisture-impervious coating material is a cross-linkable polymeric material.

3. The improved brake shoe assembly of claim 2 wherein said coating material comprises an epoxy-based adhesive.

4. The improved brake shoe assembly of claim 1 wherein the moisture-impervious coating material is effectively bonded to the entire outer surface of said brake shoe table.

5. The improved brake shoe assembly of claim 4 wherein the brake shoe table has a plurality of peripheral side edges, each of which has a coating of said moisture-impervious material effectively bonded thereto.

6. The improved brake shoe assembly of claim 4, wherein the moisture-impervious coating material is further effectively bonded to the inner surface of the brake shoe table.

7. The improved brake shoe assembly of claim 6 wherein said arcuate web comprises at least one strut having a pair of flat side surfaces and the moisture-impervious coating material is further effectively bonded to said flat side surfaces.

8. An improved brake shoe having an arcuate web and an arcuate brake shoe table mounted on an inner surface thereof to said web with an outer surface of said brake shoe table adapted for having a friction liner positioned atop and fastened thereto, wherein the improvement comprises:

a moisture-impervious coating material applied to said brake shoe table, said coating material effectively bonded to at least the portion of said outer surface of the brake shoe table adapted for fastening of the friction liner prior to said friction liner being secured to the brake shoe table; said moisture-impervious coating material being substantially non-adhesively bonded to said friction liner.

9. The improved brake shoe assembly of claim 8 wherein said moisture-impervious coating material is a cross-linked polymeric material.

10. The improved brake shoe assembly of claim 9 wherein said coating material comprises an epoxy-based adhesive.

11. The improved brake shoe assembly of claim 8 wherein the moisture-impervious coating material is effectively bonded to the entire outer surface of said brake shoe table.

12. The improved brake shoe assembly of claim 11 wherein the brake shoe table has a plurality of peripheral side edges, each of which has a coating of said moisture-impervious material effectively bonded thereto.

13. The improved brake shoe assembly of claim 11 wherein the moisture-impervious coating material is further effectively bonded to the inner surface of the brake shoe table.

14. The improved brake shoe assembly of claim 13 wherein said arcuate web comprises at least one strut having a pair of flat side surfaces and the moisture-impervious coating material is further effectively bonded to said flat side surfaces.

* * * * *